United States Patent [19]
Castan et al.

[11] 3,830,403
[45] Aug. 20, 1974

[54] DYNAMIC PROPORTIONAL METERING DEVICE FOR FLUIDS

[75] Inventors: Joseph Castan; Claude Francis Fernand Yves Fremont, both of Levallois, France

[73] Assignee: HERFILCO, Levallois (Hauts de Seine), France

[22] Filed: Aug. 21, 1973

[21] Appl. No.: 390,259

[30] Foreign Application Priority Data
Sept. 26, 1972 France .............................. 72.34059

[52] U.S. Cl.................. 222/57, 137/564.5, 222/193
[51] Int. Cl............................................. B67d 5/18
[58] Field of Search ...... 137/101.11, 564.5; 222/52, 222/55, 57, 59, 145, 193; 239/310, 313

[56] References Cited
UNITED STATES PATENTS
2,563,211  8/1951  Cassese........................ 137/564.5 X
3,200,840  8/1965  Watts............................... 137/564.5
3,283,957  11/1966  Henderson........................... 222/57

*Primary Examiner*—Allen N. Knowles
*Assistant Examiner*—Larry H, Martin
*Attorney, Agent, or Firm*—Fleit, Gipple & Jacobson

[57] ABSTRACT

This dynamic proportional metering device for fluids comprises a time-lag unit and a capacity of which the filling time is a linear function of the main fluid output, a pressure pulse generator delivering pulses at a frequency proportional to said filling time and a function of the main fluid output, a pulse regulator, a pulse pump for displacing a volume of intermediate fluid acting upon a compression chamber co-acting with a secondary-fluid injection unit; this metering device is particularly suited for injecting an odorous fluid into a stream of natural gas.

4 Claims, 4 Drawing Figures

DYNAMIC PROPORTIONAL METERING DEVICE FOR FLUIDS

The present invention relates to dynamic proportional metering devices for fluids and is directed to an improved device of this character intended more particularly but not exclusively for injecting a liquid odorous fluid into a natural gas. Another possible application of this device may be the mixing of several ingredients in proportions determined with precision.

When it is desired to meter a secondary fluid proportionally to a main fluid output, two types of methods may be adhered to, basically.

The so-called static methods utilize mixing chambers. In these methods, one fraction of the main fluid is saturated by tapping or by-passing with the secondary fluid put into direct contact therewith, the mixture being subsequently reinjected into the main duct of conduit. By properly selecting the diameters of the various pipe lines, a certain proportionality is actually obtained, but this proportionality is rapidly modified even by very moderate temperature variations.

The so-called dynamic methods such as those carried out in servo-controlled metering pumps require the use of a counter delivering an electric signal utilized for varying the output of a mechanical pump.

It is an essential object of the present invention to provide a device capable of metering and possibly injecting a secondary fluid in proportion to the output of a main fluid while combining the advantages features of the two known types of methods mentioned hereinabove and eliminating their inconveniences.

The device according to this invention may be rendered on the one hand completely self-operating by deriving the power necessary for its operation from the main fluid stream, and on the other hand fluid-tight by re-injecting any leakage fluid into this stream.

The present invention is based on the following principle: a tank containing the main fluid is emptied into a header through a conduit enclosing a vacuum generating member, for example a diaphragm. On the other hand, a metering member picks up secondary fluid from a tank for injecting this secondary fluid into another downstream header with an output proportional to that obtaining in the conduit connecting the first or main-fluid tank to the first header. Any leakage may be recovered in the header which may also provide the necessary auxiliary driving counterpressure; thus, a self-operating and fluid-tight apparatus is obtained. The two headers may be separate headers or merged into one.

According to this invention, in an arrangement of the type disclosed hereinabove the dynamic proportional metering device for the secondary fluid is characterised in that it comprises a time-lag device consisting of a proportional output regulator and a capacity of which the filling time is a linear function of the main fluid output; a pulse generator consisting of a plurality of pistons generating a pressure pulse frequency proportional to the filling time of said time-lag capacity and a linear function of the main fluid output; a pulse regulator consisting of a capacity connected to said pulse generator, to a pump and to the downstream side of the expansion; a pulse pump for injecting a volume of intermediate fluid acting on a compression chamber co-acting with a secondary fluid injection unit; said metering device being further characterised in that it comprises, in addition to said dynamic members, three static members, namely a filter for the driving fluid, a secondary fluid filter and a reservoir for containing the oil or any other suitable intermediate liquid fluid.

Other features and advantages of this invention will appear as the following description proceeds with reference to the attached drawings illustrating diagrammatically by way of example a typical form of embodiment of the invention. In the drawings.

Figure 1:
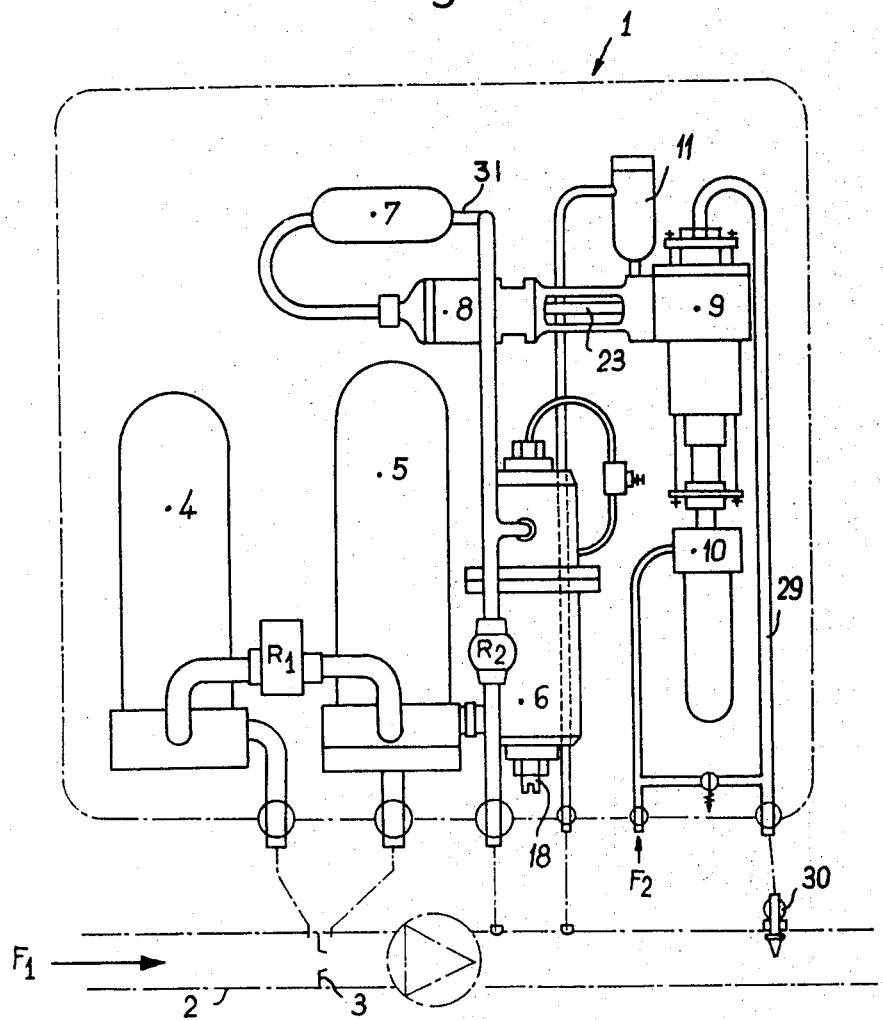
FIG. 1 is a general diagram of the metering device of this invention.

Refering first to FIG. 1 showing in a dash-and-dot line frame 1 the general arrangement of the metering device of this invention, a main conduit section 2 in which the main fluid can flow in the direction shown by the arrow $F_1$ has fitted therein a vacuum generating member 3 such as a diaphragm.

The metering device comprises a driving-fluid filter 4 for cleaning the driving fluid, which is followed by a time-lag device 5 with the interposition of a proportioning device $R_1$ (the information taken from the diaphragm may be replaced by any suitable pressure information or an information representing the differential pressure between two points, which may possibly lead to the limitation of $R_1$), a pressure pulse generator 6, a pressure pulse regulator 7, followed by a pulse pump 8 and a secondary fluid injection unit 9 to which a secondary fluid $F_2$ is delivered through a secondary fluid filter 10; an oil reservoir 11 for a purpose to be explained presently, being also provided.

The structure and mode of operation of each one of the above-listed members and units will now be explained in detail.

Figure 2:
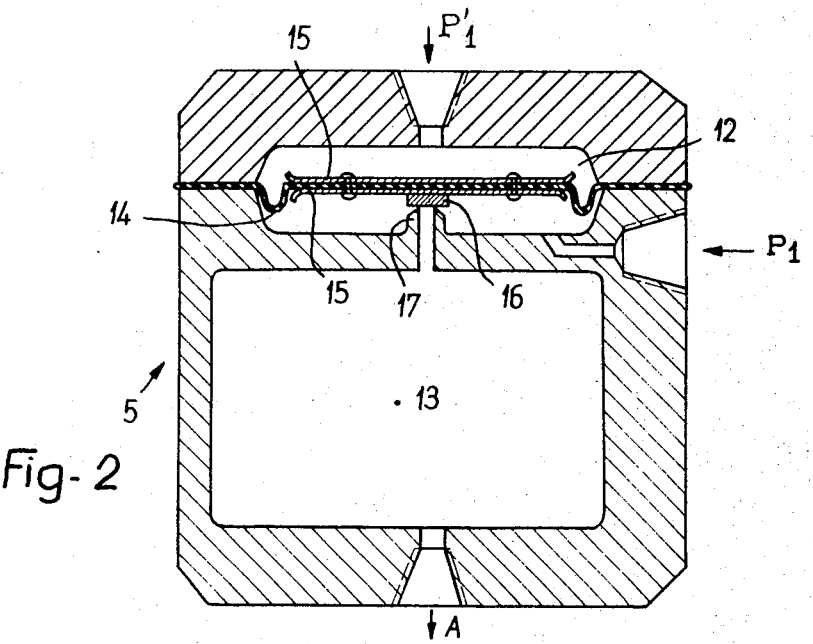
FIG. 2 is a sectional view of the time-lag device.

FIG. 2 illustrates the structure of the time-lag device 5 comprising essentially a proportional output regulator 12 and a capacity or chamber 13. By adjusting this regulator 12 the capacity 13 can be filled more or less rapidly so as to render the filling time T of this capacity a linear function of the main output Q. The derivated output $q$ flowing through this regulator 12 is obtained by virtue of the vacuum-generator 3 fitted in the main conduit 2.

The time-lag device 5 operates as follows: when no fluid output is produced in the main conduit, the movable assembly of regulator 12 (i.e. diaphragm 14, plate 15, seat 16) is inoperative and closes the feed nozzle 17 leading to chamber 13. When an output is circulating in said main fluid conduit, a want of balance occurs in the pressures on either side of the diaphragm 3 (with upstream pressure $P_1$ greater than downstream pressure $P'_1$) and also of the movable assembly of regulator 12, thus opening the feed nozzle 17.

If the output Q increases, $P'_1$ decreases, the nozzle opening increases, and vice-versa. The variation of $P'_1$ is rendered proportional to the output Q due to the presence of $R_1$, whereby the displacement of the movable assembly and the filling time T of chamber 13 are proportional to Q. Therefore, the time-lag device causes T to be equal to $f(Q)$.

Figure 3:
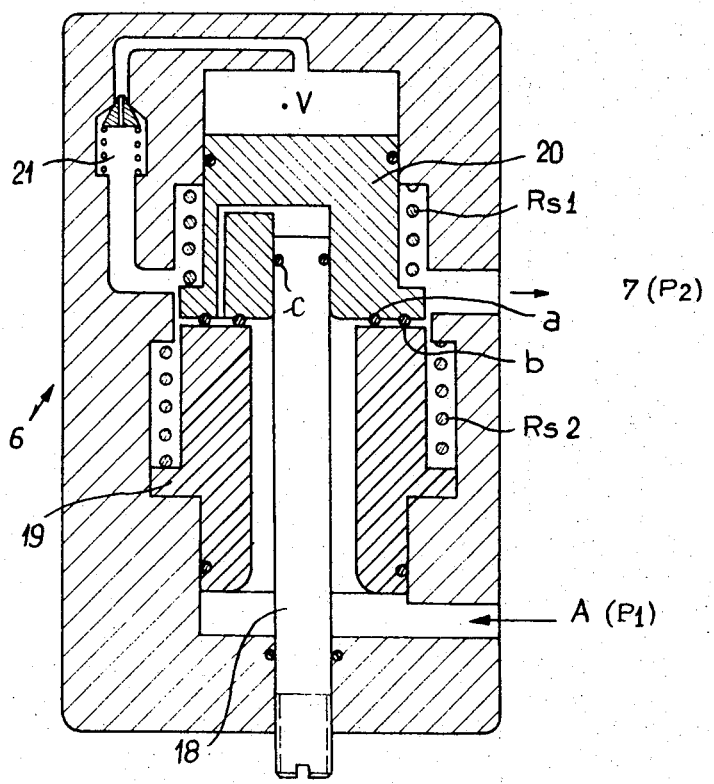
FIG. 3 is another sectional view showing the pressure pulse generator.

The chamber 13 opens into the pressure pulse generator 6 (FIG. 3) comprising three pistons 18, 19 and 20, of which pistons 19 and 20 are movable, piston 18 being stationary and adjustable, and a pair of return springs $Rs1$, $Rs2$ associated with pistons 20 and 19, respectively. A differential non-return valve 21 permits an integral flow in one direction and a reduced flow in the opposite direction.

The pressure pulse generator 6 operates as follows: the pressure $P_1$ increasing in time-lag device 5 forces the piston 19 upwards thus pushing the next piston 20, whereby return springs $Rs1$ and $Rs2$ are compressed. Therefore, three actions take place simultaneously;

i. Since pressures $P_1$ and $P_2$ differs, with $P_1 > P_2$ ($P_2$ being the pressure in volume V above piston 20), pistons 19 and 20 move upwards, the fluid tightness between these pistons being ensured by concentric O-rings $a$ and $b$.

ii. The volume V compressed by piston 20 escapes downwards through the differential non-return valve (full flow).

iii. Since piston 18 is fixed, it determines the stroke of pistons 19 and 20, the stroke limit being the elimination of the fluid-tightness of O-ring $c$.

When this O-ring $c$ is no more tight, a pressure balance is created on piston 19, between O-rings $a$ and $b$, and since this piston is no more exposed to the differential pressure ($P_1 - P_2$) it is urged by spring $Rs2$ and quickly resumes its initial position.

Piston 20 is urged by spring $Rs1$ and its movement is attended by a suction in chamber V, this suction being retarded by the differential non-return valve 21 (restricted flow) so that the return movement of piston 20 to its initial position is slowed down.

The pressure trapped in the time-lag device expands suddenly towards the pressure pulse regulator 7.

When piston 20 resumes its contact with piston 19, the fluid tightness is restored and the cycle is resumed.

The frequency of the pressure pulses generated by the device 6 is subordinate to the filling time T of chamber 13 of time-lag device 5, and also to the return speed of piston 19. This frequency is thus made proportional to the output Q by the differential non-return valve. The pulse generator 6 will thus provide a pulse frequency F proportional to T and this frequency is a linear function of Q.

The pulse regulator 7 following the generator 6 comprises a capacity connected to the generator, to a pulse pump 8 and to the downstream end of an expansion line 31. The exhaust in the downstream direction takes place through cock R2. The compressed volume escaping suddenly from the pulse generator causes a sudden pressure increment in the regulator. The exhaust output in the downstream direction is retarded by the cock R2, so that the pressure can be maintained during a time sufficient to actuate the pump 8.

Figure 4:
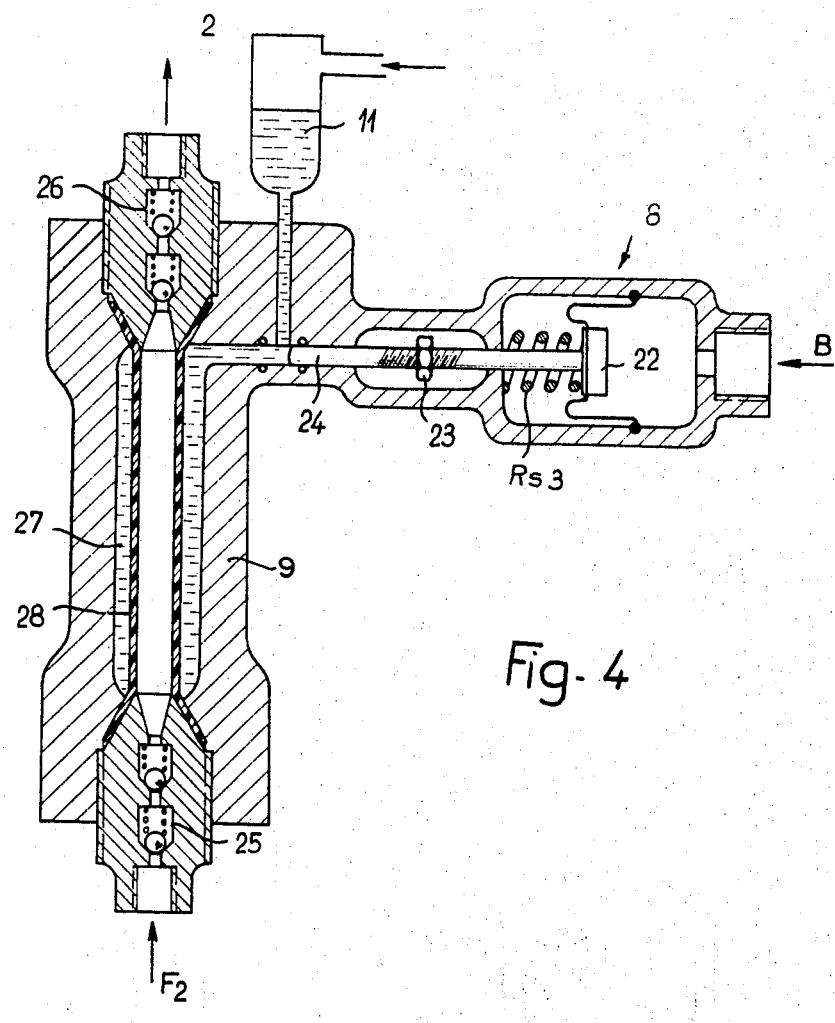
FIG. 4 is a further section showing the pulse pump and the injection unit.

Referring to FIG. 4 illustrating the pump 8 and the secondary-fluid injection unit inserted in the main conduit, it will be seen that this pump 8 comprises a diaphragm piston 22, a return spring $Rs3$, a stroke adjustment member 23, a pressure-building piston 24 rigid with said diaphragm piston, and an oil supply, this oil constituting the above-mentioned intermediate fluid.

The pump 8 operates as follows: the sudden pressure rise in regulator 7 actuates the diaphragm piston 22 which compresses the return spring $Rs3$. The pressure-building piston is thus moved and traps a certain volume of oil so as to drive same. Thus, the amount of secondary fluid injected into the main fluid stream is subordinate to this oil volume driven by the pressure-building piston.

The injection unit comprises an assembly of non-return inlet valves 25, an assembly of exhaust valves 26, a compression chamber 27 and a tube 28 of polytetrafluoroethylene or any other suitable deformable material connecting said inlet valves to said exhaust valves. The compression chamber 27 surrounds the deformable tube 28 and is filled with oil.

This unit operates as follows: the volume of oil trapped as a consequence of the movement of piston 24 and subsequently compressed in compression chamber 27 causes the tube 28 to undergo a deformation so as to compress the volume of secondary fluid contained between the inlet valves 25 and exhaust valves 26. This compression opens the exhaust valves and the secondary fluid contained in tube 28 is forced out and injected via pipe 29 and injection head 30 (see FIG. 1) into the main conduit 1. The oil suction opens the inlet and exhaust valves for the secondary fluid $F_2$ in tube 28.

This principle of operation of a pulse pump and injection unit assembly permits of metering very small amounts of secondary fluid isolated in tube 28, thus eliminating the risk of piston corrosion and also of contamination due to leakage through the unions and gland packings. Finally, it will be seen that the oil reserve of the injection unit is connected to the downstream end of the expansion side so that, when the assembly is inoperative, a zero differential pressure is obtained in tube 28.

The metering device according to this invention is operable with all fluids and capable of supplying very low secondary fluid outputs, or alternatively very high secondary fluid outputs, according to the piston diameter.

Moreover, a pulse counter may be implemented for totalizing the quantities of main and secondary fluids.

When the main-fluid and secondary fluid tanks are at the same pressure, the apparatus may be simplified by producing a continuous metering action just after the regulator 12, the main fluid being fed to the one-port chamber while the secondary fluid is fed to the two-port chamber.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

We claim:

1. A proportional metering device for fluids, characterized in that it comprises a time-lag unit connected to a main conduit said time-lag unit comprising a proportional output regulator and a capacity of which the filling time is a linear function of the main fluid output through said conduit; a pulse generator connected to said time lag-unit, said pulse generator comprising a plurality of pistons which generate a pressure pulse frequency proportional to the filling of said capacity of the time-lag unit and a linear function of the main fluid output; a pulse regulator consisting of a capacity connected to said pulse generator, to a pulse pump, and to a downstream end of an expansion line; said pulse pump having means for displacing a volume of intermediate fluid into a secondary fluid injection unit; said secondary fluid injection unit consisting of a deformable tube within a compression chamber that co-acts with the intermediate fluid for dispensing a metered amount of secondary fluid into said main conduit; the proportional metering device further including a driving fluid filter connected between said main conduit and said time-lag unit, a secondary fluid filter connected to said injection unit and an oil reservoir for storing said intermediate fluid.

2. Metering device according to claim 1, characterised in that said proportional regulator of said time-lag device consists of a diaphragm valve that closes in the absence of the main fluid output and opens proportionally to the main fluid output for filling said time-lag device capacity.

3. Metering device according to claim 1, characterised in that said pressure pulse generator pistons that compress a volume under the action of said time-lag device and create a pulse frequency that is applied to said pulse regulator which is proportional to the filling time of said time-lag device capacity and a linear function of the main fluid output.

4. Metering device according to claim 1, characterised in that said deformable tube has at one end, inlet non-return valves for the secondary fluid and at the other end exhaust non-return valves for the secondary fluid, the oil filling said compression chamber being driven by the pulse pump which means for displacing the volume of intermediate fluid comprises a pistons which is responsive to the pressure pulse action of said pressure regulator.

* * * * *